United States Patent [19]
Karakama et al.

[11] Patent Number: 5,479,078
[45] Date of Patent: Dec. 26, 1995

[54] POSITION TEACHING METHOD FOR A ROBOT

[75] Inventors: Tatsuo Karakama; Yoshitaka Ikeda; Atsushi Watanabe, all of Oshino, Japan

[73] Assignee: Fanuc Ltd., Yamanashi, Japan

[21] Appl. No.: 244,862

[22] PCT Filed: Oct. 19, 1993

[86] PCT No.: PCT/JP93/01502

§ 371 Date: Jun. 16, 1994

§ 102(e) Date: Jun. 16, 1994

[87] PCT Pub. No.: WO94/09422

PCT Pub. Date: Apr. 28, 1994

[30] Foreign Application Priority Data

Oct. 20, 1992 [JP] Japan ..................... 4-306232

[51] Int. Cl.$^6$ ............................. G05B 19/18
[52] U.S. Cl. .................. 318/568.13; 318/568.15; 318/573; 901/3
[58] Field of Search .................... 318/567, 568.1, 318/568.11, 568.13, 568.22, 568.23, 568.14, 568.15, 573, 574; 901/3, 41, 42, 43

[56] References Cited

U.S. PATENT DOCUMENTS

| | | | |
|---|---|---|---|
| 4,380,696 | 4/1983 | Masaki | 318/568 X |
| 4,568,816 | 2/1986 | Casler, Jr. | |
| 4,675,502 | 6/1987 | Haefner et al. | 318/574 X |

FOREIGN PATENT DOCUMENTS

| | | |
|---|---|---|
| 58-155189 | 9/1983 | Japan . |
| 58-225406 | 12/1983 | Japan . |
| 62-242202 | 10/1987 | Japan . |

*Primary Examiner*—Bentsu Ro
*Attorney, Agent, or Firm*—Staas & Halsey

[57] ABSTRACT

A robot teaching position method for easily modifying an original position of one of a plurality of taught points arranged on a straight line to a modified position moved a distance along the straight line from the original position. An operator selects one of the plurality of taught points, inputs a distance of movement along the straight line from the one taught point to the modified point, and selects two arbitrary taught points arranged on the straight line, using a display device attached to a manual data input device attached to a robot controller. The modified position is determined based on the inputted first taught point, the distance, and the second and third taught points. A robot performs an operation based on the modified position.

3 Claims, 5 Drawing Sheets

```
TAUGHT POSITION MODIFICATION MODE
              DATE:04/10/15
              OPERATOR CODE:FN002035

[MODIFICATION 1]

<D>:Pi→Pj         i=□□□□
                      j=□□□□
    Δ:Ps→Qs           s=□□□□
    δ:δs=|Δs|         δs=+□□□. □mm
                         -□□□. □mm

[MODIFICATION 2]

<D>:Pi→Pj         i=□□□□
                      j=□□□□
    Δ:Ps→Qs           s=□□□□
    δ:δs=|Δs|         δs=+□□□. □mm
                         -□□□. □mm

[MODIFICATION 3]

<D>:Pi→Pj         i=□□□□
                      j=□□□□
    Δ:Ps→Qs           s=□□□□
    δ:δs=|Δs|         δs=+□□□. □mm
                         -□□□. □mm

EXECUTION OF MODIFICATION? : Y/N
```

```
TAUGHT POSITION MODIFICATION MODE

DATE:04/10/15
                    OPERATOR CODE:FN002035

[ MODIFICATION 1]

<D>: P i → P j      i =☐☐☐☐
                          j =☐☐☐☐
      Δ : P s → Q s       s =☐☐☐☐
      δ : δ s = |Δ s|     δ s =+☐☐☐.☐mm
                               -☐☐☐.☐mm

[ MODIFICATION 2]

<D>: P i → P j      i =☐☐☐☐
                          j =☐☐☐☐
      Δ : P s → Q s       s =☐☐☐☐
      δ : δ s = |Δ s|     δ s =+☐☐☐.☐mm
                               -☐☐☐.☐mm

[ MODIFICATION 3]

<D>: P i → P j      i =☐☐☐☐
                          j =☐☐☐☐
      Δ : P s → Q s       s =☐☐☐☐
      δ : δ s = |Δ s|     δ s =+☐☐☐.☐mm
                               -☐☐☐.☐mm

EXECUTION OF MODIFICATION? : Y/N
```

FIG. 5

POSITION TEACHING METHOD FOR A ROBOT

FIELD OF THE INVENTION

The present invention relates to a position teaching method applicable to robots for industrial and other uses, which operate according to a taught program, and, more particularly to a position teaching method for robots applicable when modifying the position which has already been taught (taught position).

DESCRIPTION OF THE RELATED ART

When a robot for industrial or other use (hereinafter simply called a robot), which operates according to a taught program, is used to perform various operations, the need for changing the position taught by a program arises frequently.

In changing the taught position, one of the generally practiced methods is to move the robot actually to the modified position (that is, the taught position to be realized after the modification has been made) by manual feeding or with other means to store the position, or to input the data of modified position directly. However, when the amount of the modification is known in advance, it is popular for the operator to input the amount of position modification for changing the taught position.

As a typical example of modifying the taught position, there is a case where only the taught position is changing without changing the direction between taught positions in the program already taught before performing the actual operation.

For example, in the case where position teaching has been performed for a robot in a form of program teaching to perform operations such as grasping, carrying, or arc welding on a plurality of workpieces of a predetermined size L arranged linearly at predetermined intervals D, when the predetermined interval D or the predetermined size L is changed, it is apparently inefficient to perform teaching by manual feeding or re-preparation of the entire program. Thus, it is preferable for the operator to input the taught position modification data.

Conventionally, in such a case as is described above, the operator had to perform preparatory work to specify the position modification data represented on the same coordinate system as that on which the already taught position data are based or the data which can be converted into the position change data in the robot controller (the position modification data represented on the coordinate system which has been set in advance for the robot or on the reference coordinate system).

As described above, to input the taught position modification data by the conventional method, preparatory work is required to specify the position modification data represented on the coordinate system set in advance for the robot or on the reference coordinate system. However, it is not always easy for the operator to perform such preparatory work quickly and accurately, because the operators are not necessarily familiar with these coordinate systems in many instances.

Even if the operator is familiar with these coordinate systems, the actual position change is not always in parallel to the direction of either axis of these coordinate systems (direction of X-, Y- or Z-axis of the orthogonal coordinates, or direction of r, θ, or φ of the polar coordinates). Therefore, the change data for each axis component (X component, θ component, etc.) must be determined. In the case of the operation on the aforementioned workpieces arranged linearly, for example, the direction of the position change along the arrangement direction or the size change direction is not always exactly in parallel to one axis of the coordinate system set for the robot or the reference coordinate system.

It is therefore necessary in general to find the data corresponding to the cosine of direction of the vector, which is directed from the position before modification toward the position after modification and represented on the concerned coordinate system, and to calculate the component of the amount of modification based on such data. Such work is complicated, and sometimes extra measurement work (for example, the measurement in the workpiece arrangement direction, or the measurement in the size change direction) will have to be added for this purpose.

SUMMARY OF THE INVENTION

An object of the present invention is to provide a position teaching method for a robot designed to reduce the aforementioned loads on the operator in performing the taught position modification such that any taught position is changed along the direction between any taught positions in a program, and the taught position can be modified very easily without involving cumbersome procedure such as the identification of coordinate system and the conversion of position modification data (calculation of component).

To achieve the above object according to the present invention where the position of any taught point, out of a plurality of taught points taught in a program so as to be arranged on one straight line in space, is to be modified by moving the taught point a distance along the straight line, the modified position of the taught point to be modified is determined based on the position information before modification, the distance of movement along the aforementioned straight line, and the position information of two arbitrary taught points located on the aforesaid straight line.

Preferably, according to the present invention, where the position of any taught point, out of a plurality of taught points in a program taught so as to be arranged on one straight line in space, is to be modified by moving the taught point a distance along the straight line, the modified position of the taught point to be modified is determined as a position vector based on the position vector before modification, the distance of movement along the aforementioned straight line, and the respective position vectors of two arbitrary taught points located on the aforementioned straight line.

Preferably, where the position vector before modification of the taught point to be modified is taken as $<OP_s>$, the distance of movement along the aforementioned straight line as $\delta s$, and the position vectors for two arbitrary taught points located on the aforementioned straight line as $<D_i>$ and $<D_j>$, respectively, the modified position vector $<OQ_s>$ of the taught point to be modified is determined from the following equation:

$$<OQ_s>=<OP_s>+(\delta_s/d_{ij})<D_{ij}>$$

where, $$<D_{ij}>=<D_j>-<D_i>$$

$$d_{ij}=|<D_{ij}>|$$

DETAILED DESCRIPTION OF THE PREFERRED EMBODIMENTS

Figure 1:
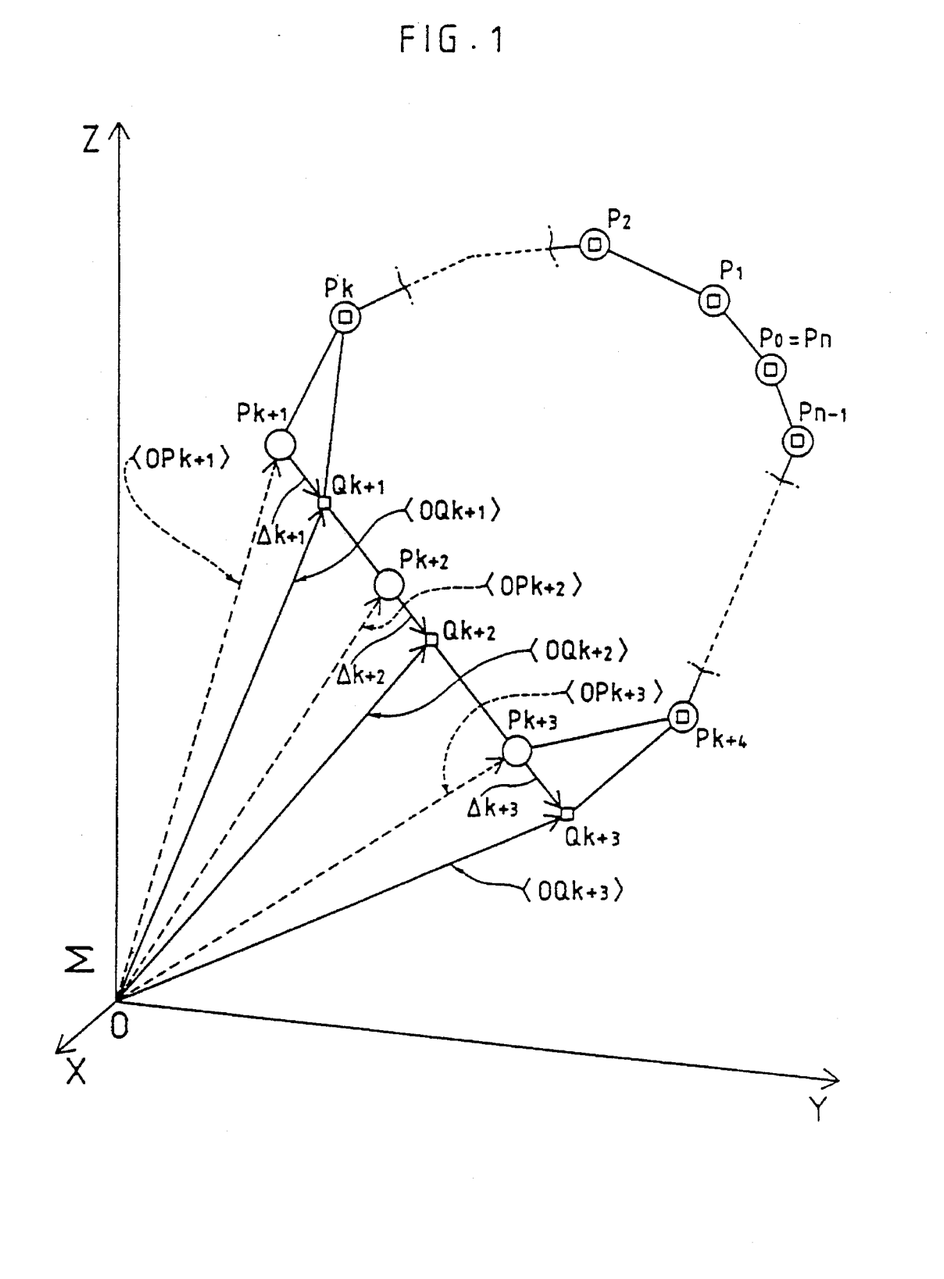
FIG. 1 is a view for illustrating the principle on which the taught position is modified by the position teaching method of the present invention.

FIG. 1 schematically shows the relationship between the robot movement locus including the taught position before modification (the position already taught) and the robot movement locus including the taught position after modification (the position to be taught newly) to illustrate the principle of the present invention.

In FIG. 1, each taught position is defined by an XYZ-axes orthogonal coordinate system $\Sigma$ with the origin O being its center. This coordinate system $\Sigma$ is normally a base coordinate system or a world coordinate system.

In this FIG. 1, the path of the taught positions already taught covers $P_0 \to P_1 \to P_2 \to \ldots \to P_k \to P_{k+1} \to P_{k+2} \to P_{k+3} \to P_{k+4} \to \ldots P_{n-1} \to P_n$ $(=P_0)$. Of these taught positions, the taught positions $P_{k+1}$, $P_{k+2}$ and $P_{k+3}$ are considered to be located on one straight line as shown in FIG. 1. Hereinafter, the interval connecting these positions $P_{k+1}$, $P_{k+2}$ and $P_{k+3}$ is called the linear interval (before modification).

Now, let us consider the correction in which the taught positions $P_{k+1}$, $P_{k+2}$ and $P_{k+3}$ are respectively shifted by $\delta_{k+1}$, $\delta_{k+2}$ and $\delta_{k+3}$, on one straight line that connects these taught positions. For these shift amounts, a plus symbol is applied where the shift takes place in the order of the position $P_{k+1}$, $P_{k+2}$ and $P_{k+3}$, while a minus symbol is applied where the shift takes place in the reverse order. The positions shifted from the taught positions by $P_{k+1}$, $P_{k+2}$ and $P_{k+3}$ are referred to as $Q_{k+1}$, $Q_{k+2}$ and $Q_{k+3}$, respectively. As a result, the path of the taught positions after modification is indicated by $P_0 \to P_1 \to P_2 \to \ldots \to P_k \to Q_{k+1} \to Q_{k+2} \to Q_{k+3} \to P_{k+4} \to \ldots P_{n+1} \to P_n$ $(=P_0)$. Of these taught positions, the positions $Q_{k+1}$, $Q_{k+2}$ and $Q_{k+3}$ are located on one straight line (that is, on one straight line connecting the positions $P_{k+1}$, $P_{k+2}$ and $P_{k+3}$).

For the linear interval before modification, the vector directed from the taught position $P_{k+1}$ to $P_{k+2}$ and the vector directed from the taught position $P_{k+2}$ to $P_{k+3}$ are referred to as $<D_{k+1}>$ and $<P_{k+2}>$, respectively. Further, the vector directed from the position $P_{k+1}$ to the modified position $Q_{k+1}$, the vector directed from the position $P_{k+2}$ to the modified position $Q_{k+2}$, and the vector directed from the position $P_{k+3}$ to the modified position $Q_{k+3}$ are referred to as $<\Delta_{k+1}>$, $<\Delta_{k+2}>$ and $<\Delta_{k+3}>$, respectively (hereinafter, these three vectors are referred to as modifying vectors). All of these vectors $<D_{k+1}>$, $<D_{k+2}>$, $<\Delta_{k+1}>$, $<\Delta_{k+2}>$ and $<\Delta_{k+3}>$ lie on one straight line.

The absolute values of the vectors $<D_{k+1}>$ and $<D_{k+2}>$ are referred to as $d_{k+1}$ and $d_{k+2}$, respectively. The absolute values of the modifying vectors $<\Delta_{k+1}>$, $<\Delta_{k+2}>$ and $<\Delta_{k+3}>$ correspond to the aforementioned shift amounts of $\delta_{k+1}$, $\delta_{k+2}$ and $\delta_{k+3}$, respectively.

The following relationship holds between the vector $<D_i>$ (i=k+1, k+2) and the modifying vector $<\Delta_j>$ (j=k+1, k+2, k+3).

$$<\Delta_{k+1}> = (\delta_{k+1}/d_{k+1}) <D_{k+1}> \quad (1)$$
$$= (\delta_{k+1}/d_{k+2}) <D_{k+2}>$$

$$<\Delta_{k+2}> = (\delta_{k+2}/d_{k+1}) <D_{k+1}> \quad (2)$$
$$= (\delta_{k+2}/d_{k+2}) <D_{k+2}>$$

$$<\Delta_{k+3}> = (\delta_{k+3}/d_{k+1}) <D_{k+1}> \quad (3)$$
$$= (\delta_{k+3}/d_{k+2}) <D_{k+2}>$$

Next, the position vectors for the positions $P_{k+1}$, $P_{k+2}$, $P_{k+3}$, $Q_{k+1}$, $Q_{k+2}$ and $Q_{k+3}$, with the origin O being the staring point are represented as shown in the figure, and referred to as $<OP_{k+1}>$, $<OP_{k+2}>$, $<OP_{k+3}>$, $<OQ_{k+1}>$, $<OQ_{k+2}>$ and $<OQ_{k+3}>$. Then, the following relationships hold.

$$<D_{k+1}>=<OP_{k+2}>-<OP_{k+1}> \quad (4)$$

$$<D_{k+2}>=<OP_{k+3}>-<OP_{k+2}> \quad (5)$$

$$<OQ_{k+1}>=<OP_{k+1}>+<\Delta_{k+1}> \quad (6)$$

$$<OQ_{k+2}>=<OP_{k+2}>+<\Delta_{k+2}> \quad (7)$$

$$<OQ_{k+3}>=<OP_{k+3}>+<\Delta_{k+3}> \quad (8)$$

Substituting the equations (1) to (3) into the right sides of equations (6) to (8), respectively, give $$<OQ_{k+1}> = <OP_{k+1}> + (\delta_{k+1}/d_{k+1}) <D_{k+1}> \quad (9)$$
$$= <OP_{k+1}> + (\delta_{k+1}/d_{k+2}) <D_{k+2}>$$

$$<OQ_{k+2}> = <OP_{k+2}> + (\delta_{k+2}/d_{k+1}) <D_{k+1}> \quad (10)$$
$$= <OP_{k+2}> + (\delta_{k+2}/d_{k+2}) <D_{k+2}>$$

$$<OQ_{k+3}> = <OP_{k+3}> + (\delta_{k+3}/d_{k+1}) <D_{k+1}> \quad (11)$$
$$= <OP_{k+3}> + (\delta_{k+3}/d_{k+2}) <D_{k+2}>$$

Here, the position vectors $<OP_{k+1}>$, $<OP_{k+2}>$ and $<OP_{k+3}>$ have already been taught. In other words, these position vectors are normally the information already stored in the memory of the robot controller in the form of position data on the coordinate system $\Sigma$ (XYZ components).

The absolute values $d_{k+1}$ and $d_{k+2}$ of the vectors $<D_{k+1}>$ and $<D_{k+2}>$ are determined by calculating the distance between the already taught positions $P_{k+1}$ and $P_{k+2}$ and the distance between the positions $P_{k+2}$ and $P_{k+3}$. This is because the distance $d_i$ between two points $P_i$ $(X_i, Y_i, Z_i)$ and $P_{i+1}$ $(X_{i+1}, Y_{i+1}, Z_{i+1})$ defined by the coordinate system $\Sigma$ can be determined by the following equation:

$$d_i=[(X_{i+1}-X_i)^2+(Y_{i+1}-Y_i)^2+(Z_{i+1}-Z_i)^2]^{1/2} \quad (12)$$

The shift quantity $\delta_j$ (j=k+1, k+2, k+3) on the linear interval for modifying the taught position is a value directly relating to the modification amount of, for example, the size or arrangement interval of the workpiece, and is a scalar quantity which the operator can define without considering the coordinate system $\Sigma$.

The above equation means that, assuming that points $P_{k+1}$, $P_{k+2}$ and $P_{k+}$ are located on one straight line in space, when a modification is made so that the point $P_{k+2}$ is shifted by $\delta_{k+2}$ toward the point $P_{k+}$ along the straight line, the position of the modified point $Q_{k+2}$ is determined as the position vector $<OQ_{k+2}>$ by the following equation. That is, from Eq.(10), $$<OQ_{k+2}>=<OP_{k+2}>+(\delta_{k+2}/d_{k+2})<D_{k+2}>$$

where $<D_{k+2}>$ can be determined from Eq.(5) as $$<D_{k+2}>=<OP_{k+3}>-<OP_{k+2}>,$$

and ti $d_{k+2}=|<D_{k+2}>|$

In effect, the position vector of the taught point after modification can be obtained from the information of the position vector $<OP_{k+2}>$ of originally taught point to be modified, the shift amount for modification, and the position vector $<OP_{k+3}>$ of another taught point located on the same straight line.

Therefore, for example, if a program for executing calculations corresponding to Eqs. (9) to (11) using the above equations (4), (5) and (12) is stored in the memory of the robot controller, the operator can perform the work for making the desired modification of taught position by merely inputting the shift amount $\delta_{k+1}$, $\delta_{k+2}$ and $\delta_{k+}$ to the robot controller to command the execution of calculation, and by storing the calculation result into the memory as the renewed value of the taught position data.

In the above description, a plurality of continuous intervals (intervals of $P_{k+1} \rightarrow P_{k+2}$; $P_{k+2} \rightarrow P_{k+3}$; $Q_{k+1} \rightarrow Q_{k+2}$; and $Q_{k+2} \rightarrow Q_{k+3}$) for each path of taught positions before and after modification have been assumed, but this condition is not a prerequisite for the present invention.

As easily inferred from the above description, the position teaching method of the present invention can be applied to the process for modifying any taught position in which at least one vector that is parallel to each modification vector $<\Delta m>$ (m may be discontinuous or continuous positive integer) and directed from a taught position $P_s$ to $P_{s+1}$ (s is 0 or any positive integer) is found.

Figure 2:
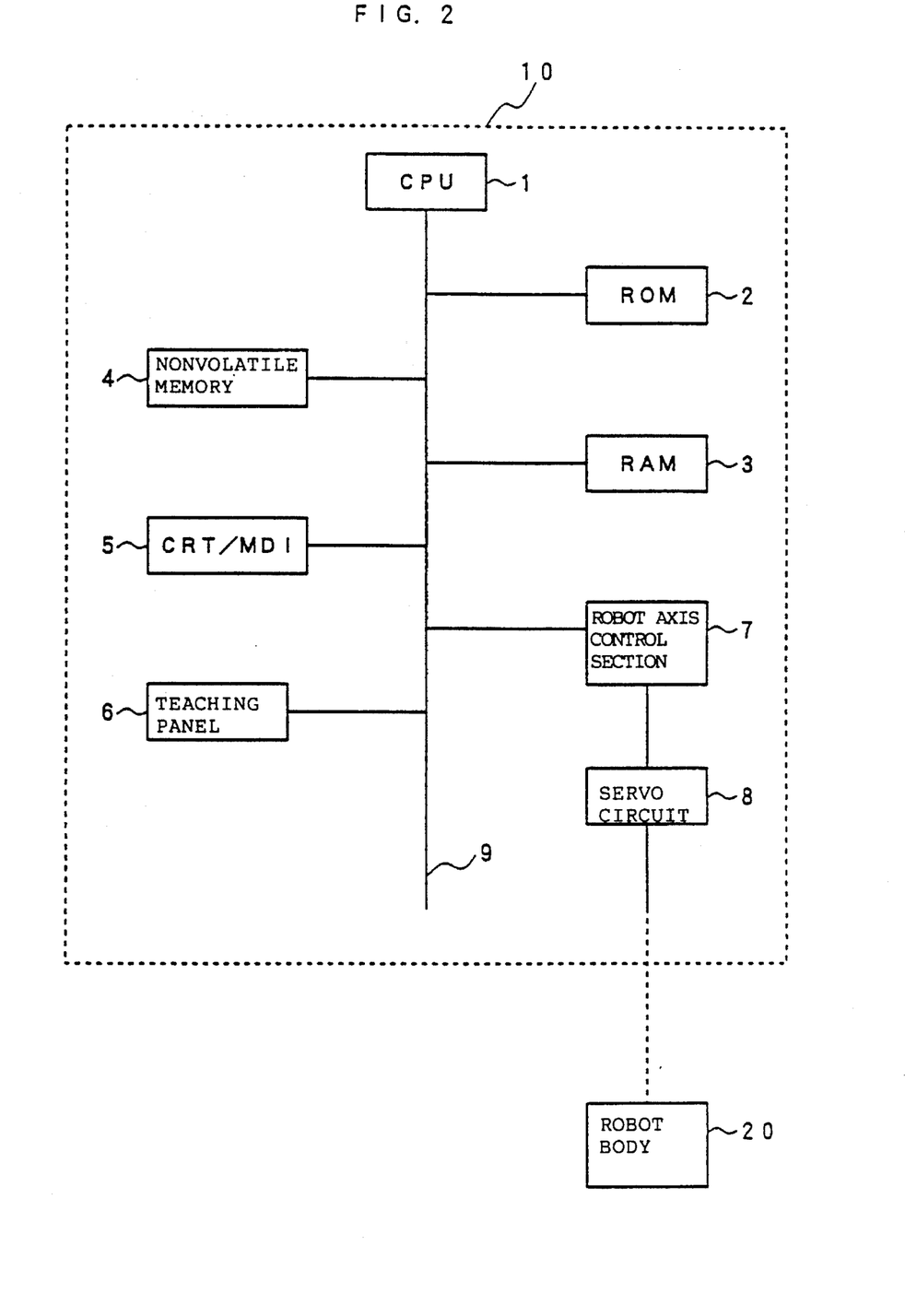
FIG. 2 is a block diagram of the principal part of a robot controller used in carrying out the position teaching method of the present invention.

FIG. 2 is a block diagram of the principal part of the robot controller used in carrying out the present invention.

In the diagram, the robot controller 10 has a central processing unit (hereinafter called CPU) 1. The CPU 1 includes memory 2 consisting of ROM, memory 3 consisting of RAM, nonvolatile memory 4 consisting of MOS etc., a manual data input device 5 with a CRT display (CRT/MDI), a teaching panel 6, and an interpolator etc., and a robot axis control section 7 for controlling each axis of a robot is connected to the CPU 1 via a bus 9. The robot axis control section 7 is also connected to the robot body 20 via a servo circuit.

The ROM 2 stores various programs which are executed by the CPU 1 to control the robot 20 and the robot controller 10 itself. The RAM 3 is used for temporary storage or calculation of data. The nonvolatile memory 4 stores the taught data inputted from CRT/MDI 5, teaching panel 6 or nonillustrated external devices. That is, the memory 4 stores programs and set values of various parameters as well as taught position data.

The above-described constitution is basically the same as that of the conventional robot controller. However, it differs from the conventional robot controller in that the memory 2 consisting of ROM stores a program for calculating the modified taught position data (XYZ components of $Q_{k+1}$) on the basis of the taught position modifying data (that is, shift amount $\delta_{k+1}$ etc.) inputted through teaching panel 6 and CRT/MDI 5 by an operator and further the above-mentioned Equations (4), (5), (9), (10), (11) and (12), to modify the address position data in RAM 3 which stores corresponding taught position data before modification.

Figure 4:
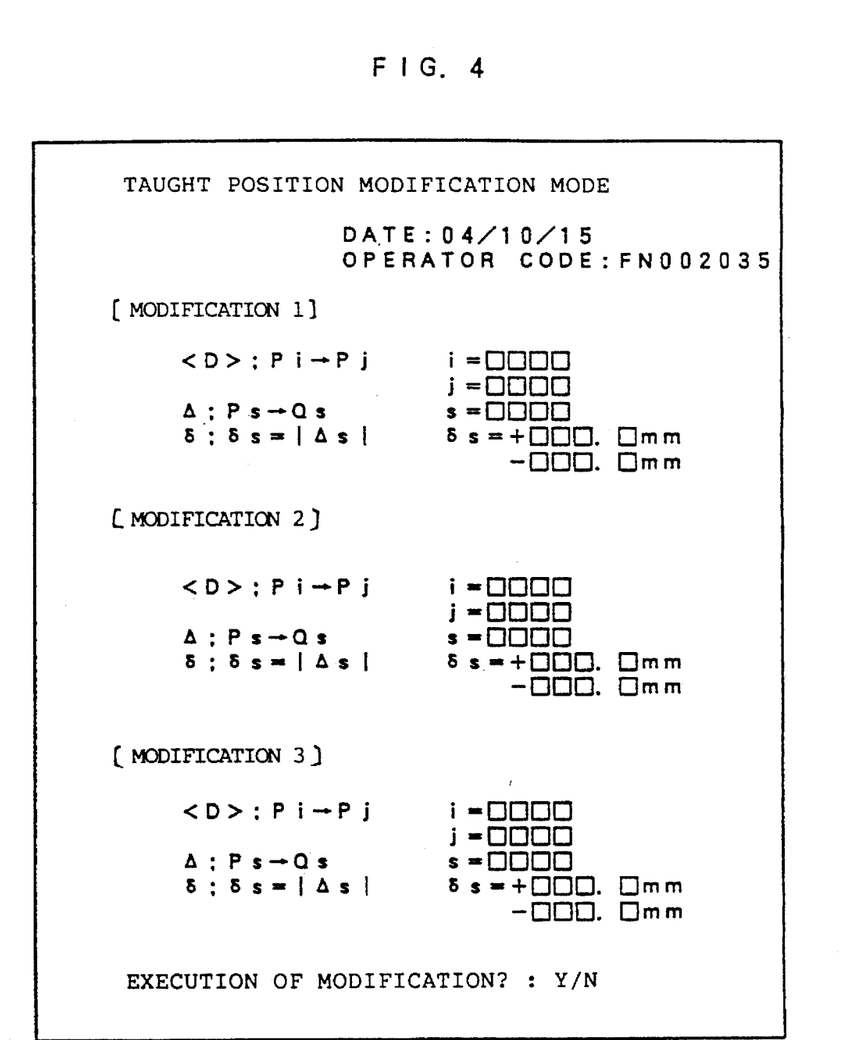
FIG. 4 is a view of the taught position data change input mode shown on a display attached to a manual data input device.

The present robot controller also differs from the conventional robot controller in that a necessary program is stored in the memory 2 consisting of ROM so that a picture of taught position modifying mode as is shown in FIG. 4 can be displayed on a display of the CRT/MDI 5 or the teaching panel 6 by the command of the operator, by which the operator can perform the modification work in an interactive mode.

On the screen of taught position modifying mode shown in FIG. 4, the operator specifies and inputs the number s of the taught position to be modified, the modification amount $\delta_s$ (the shift amount of the taught position to be modified on the linear interval), the taught position numbers i and j necessary for specifying the direction of modification vector (the numbers of two taught positions for identifying the above linear interval), date, and the operator code number using the keyboard of the CRT/MDI or the teaching panel 6. The input of the modification amount $\delta_s$ involves + or − symbol. That is, if the direction of modification is the same as the direction from position $Pi$ to position $P_j$ which specify each linear interval, the plus input line is selected; however, if the modification direction is reverse, the minus input line is selected.

The modification program, which is stored in the memory 2 consisting of ROM, is prepared so that the position data of the block number (sequence number) corresponding to the taught program can be modified on the basis of the aforementioned specified content.

An example of the procedure for performing taught position modification by the method of the present invention using the robot controller 10 with the above-described constitution and function will be described for the case where work on two types of workpieces having different dimensions as shown in FIG. 3 is assumed with reference to the display of taught position modifying mode shown in FIG. 4 and the flowchart shown in FIG. 5.

Figure 3A:
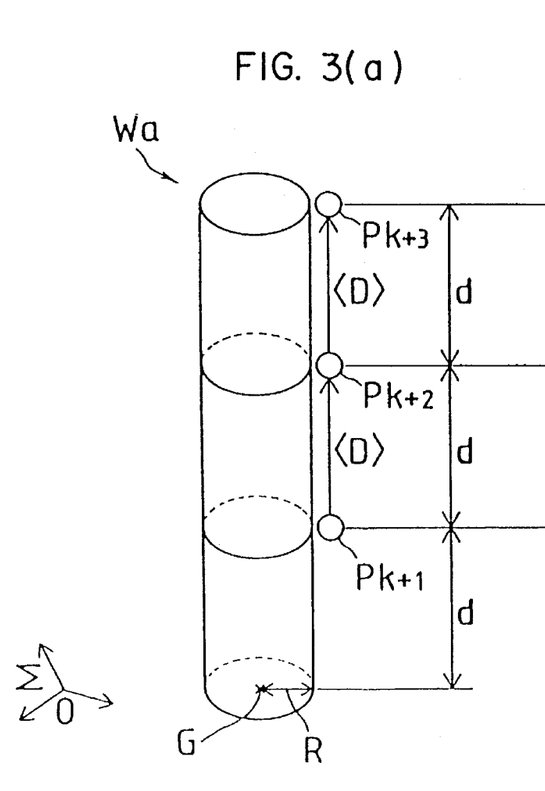
FIGS. 3(a) and 3(b) are views showing the relationship between the originally taught position and modified taught position in performing the work on two types of workpieces that have different sizes.

FIG. 3(a) schematically shows three cylindrical workpieces Wa having a bottom radius R and a thickness (length) d and arranged linearly with one point G on the coordinate system $\Sigma$ being the reference. The program of the work (e.g., welding or marking) to be done for these three workpieces is supposed to have been taught to the robot, and three points $P_{k+1}$, $P_{k+2}$ and $P_{k+}$ are also supposed to have been taught as the positions where the robot should gain access to these workpieces Wa. Since these three taught points $P_{k+1}$, $P_{k+2}$ and $P_{k+}$ are considered to be positionally equivalent, equivalent with respect to each workpiece Wa, these points are arranged on one straight line at common intervals d. The vector directed from the taught point $P_{k+1}$ to $P_{k+2}$ is equal to that directed from $P_{k+2}$ to $P_{k+3}$. This vector is denoted by $<D>$. The absolute value of the vector $<D>$ is the aforementioned interval d.

If the robot is operated according to the aforementioned taught program, the robot starts its operation from the initial position, gains access to the workpiece Wa, and moves sequentially passing $P_{k+1}$, $P_{k+2}$ and $P_{k+}$ (and each of interpolation points) to carry out a predetermined work.

Figure 3B:
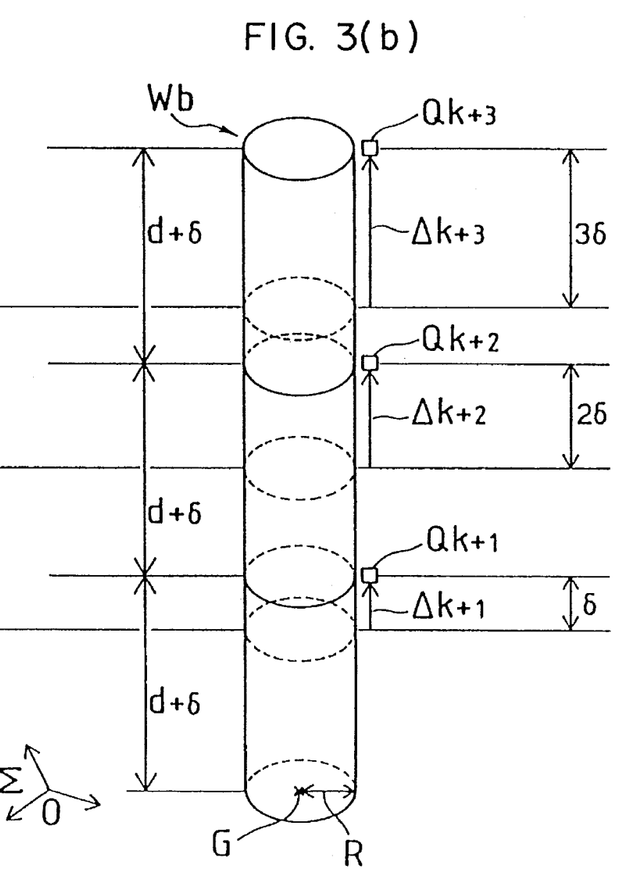

FIG. 3(b) schematically shows three workpieces Wb, in place of Wa shown in FIG. 3(a), having a bottom radius R, which is equal to the radius of Wa, and a thickness (length) d+δ, and arranged linearly with one point G on the coordinate system $\Sigma$ being the reference as with the case shown in FIG. 3(a).

Considering the case of performing the same work on the workpieces shown in FIG. 3(b) by using the robot to which the program as taught in the case of FIG. 3(a) is incorporated, the taught points $P_{k+1}$, $P_{k+2}$ and $P_{k+}$ must be modified into taught points $Q_{k+1}$, $Q_{k+2}$ and $Q_{k+3}$, respectively.

When the vectors representing the position change (displacement) from the taught point $P_{k+1}$ to the modified taught point $Q_{k+1}$, from the taught point $P_{k+2}$ to the modified taught point $Q_{k+2}$, from the taught point $P_{k+2}$ to the modified taught point $Q_{k+2}$, and from the taught point $P_{k+}$ to the modified taught point $Q_{k+}$ are taken as $<\Delta_{k+1}>$, $<\Delta_{k+2}>$ and $<\Delta_{k+3}>$, respectively, the magnitudes of the modification vectors are $\delta$, $2\delta$ and $3\delta$, respectively, as shown in FIG. 3(b).

Therefore, if taught position modification required in this case is explained with reference to FIG. 1, then either of vector $<D_{k+1}>$ and $<D_{k+2}>$ should be considered to be $<D>$, either of intervals $d_{k+1}$, $d_{k+2}$ and $d_{k+}$ be considered to be d, and further, shift amounts $\delta_{k+1}$, $\delta_{k+2}$ and $\delta_{k+}$ be considered to be $\delta$, $2\delta$ and $3\delta$ respectively.

Therefore, to determine the position data of the modified taught points $Q_{k+1}$, $Q_{k+2}$ and $Q_{k+3}$, calculation may be made using the aforementioned equations (9), (10), and (11) under the above-described conditions.

Specifically, Eqs. (1) to (3) are expressed as follows:

$$<\Delta_{k+1}> = (\delta/d)<D> \quad (13)$$

$$<\Delta_{k+2}> = (2\delta/d)<D> \quad (14)$$

$$<\Delta_{k+3}> = (3\delta/d)<D> \quad (15)$$

Equations (4) and (5) are reduced to the following equation (16):

$$<D> = <OP_{k+2}> - <OP_{k+1}> \quad (16)$$
$$= <OP_{k+3}> - <OP_{k+2}>$$

Using the above equations (13) to (15), equations (9) to (11) are reduced to the following equations.

$$<OQ_{k+1}> = <OP_{k+1}> + (\delta/d)[<OP_{k+2}> - <OP_{k+1}>] \quad (17)$$
$$= <OP_{k+1}> + (\delta/d)[<OP_{k+3}> - <OP_{k+2}>]$$

$$<OQ_{k+2}> = <OP_{k+2}> + (2\delta/d)[<OP_{k+2}> - <OP_{k+1}>] \quad (18)$$
$$= <OP_{k+2}> + (2\delta/d)[<OP_{k+3}> - <OP_{k+2}>]$$

$$<OQ_{k+3}> = <OP_{k+3}> + (3\delta/d)[<OP_{k+2}> - <OP_{k+1}>] \quad (19)$$
$$= <OP_{k+3}> + (3\delta/d)[<OP_{k+3}> - <OP_{k+2}>]$$

Here, the XYZ components of the position vectors $<OP_{k+1}>$, $<OP_{k+2}>$ and $<OP_{k+3}>$ are nothing but the position data already taught. Therefore, they can be read from the nonvolatile memory 4. The value of d can be determined by executing the calculation equivalent to that by the aforementioned equation (12) by means of the modification program stored in the memory 2 consisting of ROM, using the XYZ component data of $<OP_{k+1}>$, $<OP_{k+2}>$ and $<OP_{k+3}>$ read from the nonvolatile memory 4. Since the value of d is the thickness of the workpiece Wa, the measured value thereof can be stored in advance in the nonvolatile memory 4 as a set parameter.

As easily seen from the above description, in order to perform the modification work shown in FIG. 3 using a manual data input device (CRT/MDI) 5 or a teaching panel 6 having a display for giving the information as is shown in FIG. 4, in the field [MODIFICATION 1] on the screen, k+1 is inputted to i, k+2 is inputted to j, k+1 is inputted to s, and δ is inputted to $\delta_s$ ($=\delta_{k+1}$); in the field of [MODIFICATION 2], k+1 is inputted to i, k+2 is inputted to j, k+2 is inputted to s, and 2δ is inputted to $\delta_s$ ($=\delta_{k+2}$); in the field of [MODIFICATION 3], k+1 is inputted to i, k+2 is inputted to j, k+3 is inputted to s, and 3δ is inputted to $\delta_s$ ($=\delta_{k+3}$).

Figure 5:
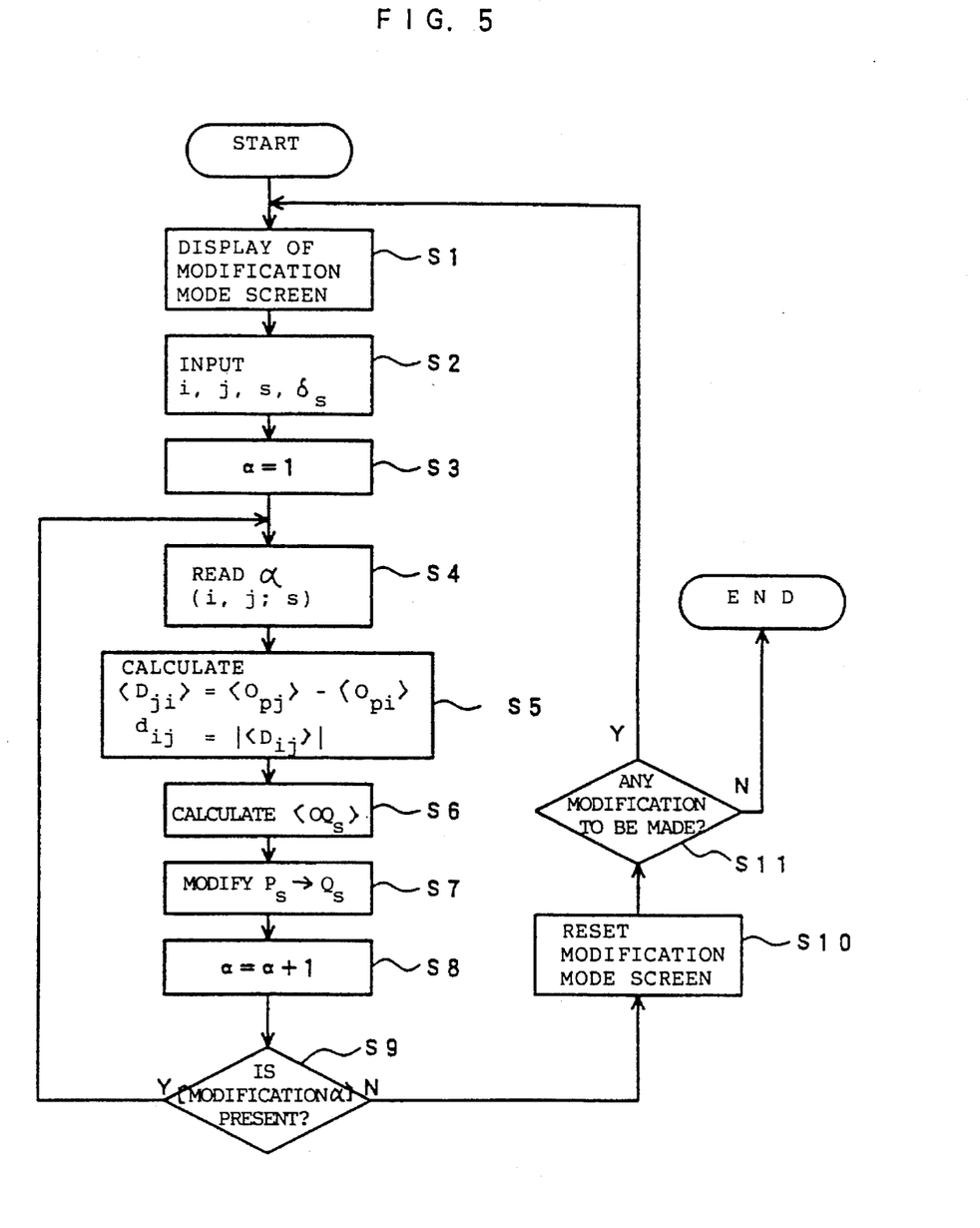
FIG. 5 is a flowchart showing an example of processing for modifying the taught position for the case indicated in FIG. 3.

A flowchart of FIG. 5 shows an example of processing for executing taught position modification using the manual data input device (CRT/MDI) 5 or the taught panel 6.

First, the power for the robot controller 10 is turned on to allow the screen of taught position modification mode shown in FIG. 4 to be given on the display of the CRT/MDI 5 or the teaching panel 6 (Step S1). Then, the operator manually inputs the values of i, j, s and $\delta_s$ in the fields of [MODIFICATION 1], [MODIFICATION 2] and [MODIFICATION 3] while watching the screen (Step S2).

As an example, for three points $P_{51}$, $P_{52}$ and $P_{53}$ forming linear intervals, it is assumed that point $P_{51}$ is shifted 50 mm (δ=+50) toward point $P_{52}$ in the direction of the straight line, point $P_{52}$ is shifted 20 mm (δ=+20) toward point $P_{53}$, and point $P_{53}$ is shifted 30 mm (δ=+30) in the direction opposite to the direction of the shift of the point $P_{52}$. In this case, in the field of [MODIFICATION 1] on the screen, to define the linear interval by a straight line connecting point $P_{51}$ and point $P_{52}$ (needless to say, the linear interval may be defined by a straight line connecting point $P_{51}$ and point $P_{53}$), 51 is inputted to i, and 52 to j, and then 51 to s to specify point $P_s$ to be modified and +50 to δ to specify the shift quantity, by the operator. Likewise in [MODIFICATION 2], 51 is inputted to i, and 52 is inputted to j, by the operator (it is unnecessary to redefine the linear interval in another form—for example, with $P_{52}$ and $P_{53}$). Further, the operator inputs 52 to s, and +20 to $\delta_s$. Further, in the field of [MODIFICATION 3], 51 is inputted to i, 52 to j, 53 to s, and +30 to $\delta_s$, by the operator.

After checking the inputted data on the screen, the operator answers the question given at the lowermost part of the screen by inputting Y indicating the completion of modification through the keyboard. Then, the CPU 1 starts modification processing.

First, the CPU 1 resets the modification number index α to 1 (Step S3), reads the taught position data corresponding to i, j and s specified in [MODIFICATION 1] from the program already taught, and temporarily stores the taught position data together with the address number into the RAM 3 (Step S4).

Then, the CPU makes calculation of $$<D_{ij}> = <D_j> - <D_i>$$

based on Eq. (4) or (5), and calculation of $$d_{ij} = |<D_{ij}>|$$

based on Eq. (12) (Step S5).
Then, calculation of $$<OQ_s> = <OP_s> + (\delta_s/d_{ij})<D_{ij}>$$

is made corresponding to Eqs. (9), (10), and (11) to determine the position vector $<OQ_s>$ of the modified position $Q_s$ (Step S6).

Thus, as soon as the modified position $Q_s$ of the point inputted in [MODIFICATION 1] is determined, the data of address number $P_s$ which the nonvolatile memory 4 stores is modified to $Q_s$ (Step S7). After the processing of [MODIFICATION 1] ends in this manner, 1 is added to the modification number index α (Step S8). If [MODIFICATION 2] exists, the procedure returns to Step S4 (Step S9), and the processings in Steps S4 to S7 are executed again for

[MODIFICATION 2]. In this embodiment, since the modification for the data displayed on one screen ends when α=3, three cycles of processings in total in Steps S4 to S7 are repeated to complete the taught position modification for one display. After that, α becomes 4 in Step S8, and the processing proceeds to Step S10.

In Step S10, the modification screen mode on the CRT/MDI 5 or the teaching panel 6 is reset to terminate the display of the data of i, j, s and $δ_s$. If there are any taught position to be modified other than those indicated in the fields of [MODIFICATION 1] to [MODIFICATION 3], the operator calls out the modification screen mode again (Step S11, Step S1) to perform the modification work in the same manner as the preceding cycle.

In the case shown in FIG. 4, the number of teaching positions to be modified is three in all, and there is no other taught positions to be modified, and so it is judged that the answer is No, and all of modification work ends.

Although the modification data has been inputted manually in the above description, the modification of taught positions can also be made in such a manner that the operator prepares modification data in an off-line mode and loads the data once into the nonvolatile memory 4 via a nonillustrated input device together with the data of the address number etc. of the data of taught position to be modified, and then the robot controller reads the data by the command of the operator to perform collective modification processing of the taught positions.

According to the position teaching method of the present invention, the operator can be saved from cumbersome work such as converting the position modification data by identifying the coordinate system in making the kind of taught position modification requiring only the change of the taught position without changing the direction between the teaching positions in the program already taught. That is to say, the operator needs to input only the value which can easily be understood as the modification amount at the actual work level (scalar quantity $δ_j$) into the robot controller etc. Therefore, very efficient work can be performed by utilizing the program which has already been taught.

In particular it is a notable advantage of the present position modification method that, even if there are variations in the size of workpiece or the number of arranged workpieces, the program already taught can be used effectively by providing it with only the least necessary modification such as specifying the modification amount ($δ_j$) and the position to be modified in the program already taught using a block number (sequence number) etc.

We claim:

1. A robot teaching position method for modifying an original position of one of a plurality of taught points arranged on a straight line to a modified position moved a distance along said straight line from said original position, comprising the steps of:

providing first position information of said original position of said one taught point;

providing said distance of movement along said straight line from said original position to said modified position;

providing second position information of a second and a third of said plurality of taught points arranged on said straight line;

determining said modified position based on said first position information, said distance, and said second position information obtained at said providing steps; and performing a robot operation based on said modified position obtained at said determining step.

2. A robot teaching position method for modifying an original position of one of a plurality of taught points arranged on a straight line to a modified position moved a distance along said straight line from said original position, comprising the steps of:

determining a first position vector of said original position of said one taught point;

providing said distance of movement along said straight line from said original position to said modified position;

determining a second position vector and a third position vector of a second and a third of said plurality of taught points arranged on said straight line, respectively;

determining a modified position vector of said modified position based on said determined first position vector, said provided distance, and said determined second and third position vectors; and performing a robot operation based on said determined modified position vector.

3. A robot teaching position method according to claim 2, wherein said step of determining said modified position vector includes the step of determining said modified position vector from the following equations:

$$<OQ_s> = <OP_s> + (δ_s/d_{ij})<D_{ij}>$$

$$<D_{ij}> = <D_j> - <D_i>$$

$$d_{ij} = |<D_{ij}>|$$

wherein $<OP_s>$ represents said first position vector, $δ_s$ represents said distance, $<D_i>$ represents said second position vector, $<D_j>$ represents said third position vector, and $<OQ_s>$ represents said modified position vector.

* * * * *

UNITED STATES PATENT AND TRADEMARK OFFICE
CERTIFICATE OF CORRECTION

PATENT NO. : 5,479,078
DATED : December 26, 1995
INVENTOR(S) : Tatsuo Karakama et al.

It is certified that error appears in the above-indentified patent and that said Letters Patent is hereby corrected as shown below:

Column 3, lines 31, 33, 37, 43, 53, and 58, delete "$P_{k\neq}$" and insert —$P_{k+3}$—;

lines 47 and 58, delete "$Q_{k\neq}$" and insert —$Q_{k+3}$—; and line 54, delete "$P_{k+2}$" and insert —$D_{k+2}$—.

Column 5, lines 2 and 4, delete "$P_{k\neq}$" and insert —$P_{k+3}$—;

line 26, delete "$\delta_{k\neq}$" and insert —$\delta_{k+3}$—; and line 53, after "circuit" insert —8—.

Column 6, lines 47, 50, and 60, delete "$P_{k\neq}$" and insert —$P_{k+3}$—; and

UNITED STATES PATENT AND TRADEMARK OFFICE
CERTIFICATE OF CORRECTION

PATENT NO. : 5,479,078

DATED : December 26, 1995

INVENTOR(S) : Tatsuo Karakama et al.

It is certified that error appears in the above-indentified patent and that said Letters Patent is hereby corrected as shown below:

Column 7, lines 4 and 10, delete "$P_{k\ne}$" and insert --$P_{k+3}$--;

line 11, delete "$Q_{k\ne}$" and insert --$Q_{k+3}$--;

line 17, delete "$d_{k\ne}$" and insert --$d_{k+3}$--; and line 18, delete "$\delta_{k\ne}$" and insert --$\delta_{k+3}$--.

Signed and Sealed this

Twenty-third Day of April, 1996

Attest:

BRUCE LEHMAN

Attesting Officer

Commissioner of Patents and Trademarks